(12) United States Patent
Chu et al.

(10) Patent No.: US 10,154,148 B1
(45) Date of Patent: Dec. 11, 2018

(54) AUDIO ECHO CANCELLATION WITH ROBUST DOUBLE-TALK DETECTION IN A CONFERENCING ENVIRONMENT

(71) Applicant: Polycom, Inc., San Jose, CA (US)

(72) Inventors: Peter L. Chu, Lexington, MA (US); Eric Elias, Brookline, MA (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 15/667,910

(22) Filed: Aug. 3, 2017

(51) Int. Cl.
| H04M 9/08 | (2006.01) |
| G10L 21/0208 | (2013.01) |
| H04M 3/00 | (2006.01) |
| H04M 3/56 | (2006.01) |
| H04N 7/15 | (2006.01) |

(52) U.S. Cl.
CPC ......... *H04M 9/082* (2013.01); *G10L 21/0208* (2013.01); *H04M 3/002* (2013.01); *H04M 3/567* (2013.01); *H04M 3/568* (2013.01); *H04N 7/15* (2013.01); *G10L 2021/02082* (2013.01)

(58) Field of Classification Search
CPC ............ G10L 21/0232; G10L 21/0364; H04M 9/082; H04M 9/085; G10K 11/002
USPC .......... 348/14.08; 370/260, 289; 379/406.01, 379/406.08, 406.12, 406.09; 381/59, 66, 381/71.1, 104, 315, 321, 356, 93; 708/313
See application file for complete search history.

(56) References Cited

U.S. PATENT DOCUMENTS

| 4,170,720 | A | * | 10/1979 | Killion ..................... H03G 7/08 330/282 |
| 5,263,019 | A | | 11/1993 | Chu |
| 5,305,307 | A | | 4/1994 | Chu |
| 5,390,244 | A | | 2/1995 | Hinman et al. |
| 5,796,819 | A | * | 8/1998 | Romesburg ........... H04M 9/082 370/291 |
| 6,959,260 | B2 | | 10/2005 | Rodman et al. |
| 6,990,084 | B2 | | 1/2006 | Hayward |
| 7,120,259 | B1 | | 10/2006 | Ballantyne et al. |
| 7,526,078 | B2 | | 4/2009 | Rodman et al. |
| 7,680,285 | B2 | | 3/2010 | Ballantyne et al. |
| 7,742,588 | B2 | | 6/2010 | Rodman et al. |
| 7,787,605 | B2 | | 8/2010 | Rodman |
| 7,864,938 | B2 | | 1/2011 | Rodman et al. |

(Continued)

OTHER PUBLICATIONS

Drumright, Thomas, Adaptive Filtering, Spring 1998.

(Continued)

*Primary Examiner* — Gerald Gauthier
(74) *Attorney, Agent, or Firm* — Blank Rome, LLP

(57) ABSTRACT

A conferencing endpoint includes a loudspeaker, a base microphone, and a double-talk detection module which allows two-way communication between the conferencing endpoint and a remote endpoint only when participants at both endpoints are speaking at the same time, so as to minimize echo due to feedback. The double-talk detection module adds the energy of any distortion from the loudspeaker to the energy of the signal coming from the remote endpoint, and compares this combined energy with the energy of the base microphone to determine whether double-talk is present. The double-talk detection module is thus prevented from mistaking the feedback for near end talk at the endpoint.

21 Claims, 3 Drawing Sheets

(56) References Cited

U.S. PATENT DOCUMENTS

| | | | |
|---|---|---|---|
| 7,912,211 B1* | 3/2011 | Lambert | H04M 9/085 |
| | | | 379/406.08 |
| 7,978,838 B2 | 7/2011 | Rodman et al. | |
| 8,320,554 B1 | 11/2012 | Chu | |
| 9,659,555 B1* | 5/2017 | Hilmes | G10L 21/0272 |
| 9,674,368 B2* | 6/2017 | Kechichian | H04M 9/082 |
| 9,928,847 B1* | 3/2018 | Cleve | G10L 21/0232 |
| 9,973,633 B2* | 5/2018 | Schroeter | H04M 9/082 |
| 2002/0064139 A1* | 5/2002 | Bist | H04B 3/23 |
| | | | 370/289 |
| 2003/0063577 A1 | 4/2003 | Hayward | |
| 2005/0286443 A1* | 12/2005 | McMillen | H04M 3/56 |
| | | | 370/260 |
| 2006/0034448 A1* | 2/2006 | Parry | H04M 9/082 |
| | | | 379/406.01 |
| 2007/0273751 A1 | 11/2007 | Sachau | |
| 2008/0024593 A1 | 1/2008 | Tsirinsky et al. | |
| 2009/0154717 A1* | 6/2009 | Hoshuyama | H04M 9/082 |
| | | | 381/66 |
| 2009/0214048 A1* | 8/2009 | Stokes, III | H04B 3/23 |
| | | | 381/66 |
| 2010/0081487 A1 | 4/2010 | Chen et al. | |
| 2011/0069830 A1 | 3/2011 | Chu et al. | |
| 2013/0003960 A1* | 1/2013 | Sollenberger | H04M 9/082 |
| | | | 379/406.01 |
| 2013/0163748 A1* | 6/2013 | Khanduri | H04M 9/082 |
| | | | 379/406.08 |
| 2015/0003606 A1* | 1/2015 | Nemer | H04M 3/002 |
| | | | 379/406.01 |
| 2015/0187348 A1* | 7/2015 | Kang | G10L 21/0208 |
| | | | 381/66 |
| 2015/0371657 A1* | 12/2015 | Gao | G10K 11/16 |
| | | | 381/66 |
| 2015/0381821 A1* | 12/2015 | Kechichian | H04M 9/082 |
| | | | 381/93 |
| 2016/0035366 A1* | 2/2016 | Matsuo | G10L 21/02 |
| | | | 381/66 |
| 2016/0140948 A1* | 5/2016 | Schroeter | H04M 9/082 |
| | | | 381/71.1 |
| 2016/0309042 A1* | 10/2016 | Kechichian | H04M 9/085 |

OTHER PUBLICATIONS

Douglas, Scott C., Introduction to Adaptive Filters, Digital Signal Processing Handbook, 1999, CRC Press LLC, Boca Raton.

U.S. Appl. No. 13/282,633, entitled "Compensating for Different Audio Clocks Between Devices Using Ultrasonic Beacon," by Peter L. Chu et al., filed Oct. 27, 2011.

* cited by examiner

AUDIO ECHO CANCELLATION WITH ROBUST DOUBLE-TALK DETECTION IN A CONFERENCING ENVIRONMENT

FIELD OF TECHNOLOGY

This disclosure pertains generally to the field of acoustic echo cancellation for two-way communication, and pertains in particular to robust double-talk detection methods and devices for augmenting such acoustic echo cancellation.

BACKGROUND

Acoustic echo is a common problem in full duplex audio systems, such as audio conferencing or videoconferencing systems. Acoustic echo occurs when the far-end speech sent over a network comes out from the near-end loudspeaker, feeds back into a nearby microphone, and then travels back to the originating site. Talkers at the far-end location can hear their own voices coming back slightly after they have just spoken, which is undesirable. To attempt to reduce this type of echo, audio systems can use various acoustic echo cancellation techniques. However, none of the existing solutions are wholly satisfactory.

SUMMARY

A conferencing endpoint emits audio received from a remote endpoint using a loudspeaker. Any distortion of the emitted audio is isolated by a distortion detection unit. Output from the distortion detection unit is used to increase the accuracy and functionality of echo cancellation performed on audio collected by one or more conferencing microphones at the conferencing endpoint.

DETAILED DESCRIPTION

Figure 1:
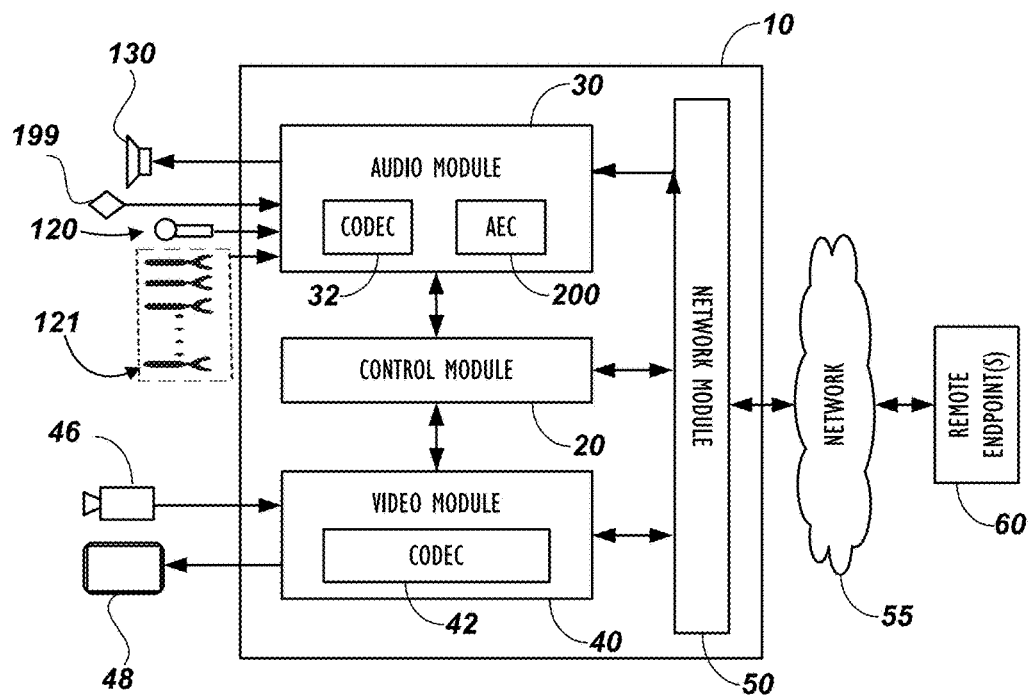
FIG. 1 illustrates a conferencing endpoint in accordance with an embodiment of this disclosure.

Videoconferencing and teleconferencing utilize echo cancellation techniques to improve the communications experience. Generally speaking, there are three modes of echo cancellation for such conferencing. In the first mode, when a conference participant is speaking at Endpoint A and participants at Endpoint B are not speaking, audio from Endpoint A is transmitted to Endpoint B, but audio from Endpoint B is not sent to Endpoint A. The loudspeaker at Endpoint A will not, therefore, emit audio collected from Endpoint B, and hence the speaker at Endpoint A will not hear her own voice as emitted by the loudspeaker at Endpoint B. In the second mode, a person is speaking at Endpoint B and those participants at Endpoint A are listening to that person. Here, audio is transmitted to the loudspeaker at Endpoint A, but not from Endpoint A to the loudspeaker at Endpoint B. In the third mode, participants are speaking at both endpoints. In the third mode, echo cancellation utilizes a double-talk detection unit to detect that participants are speaking at both endpoints. In the third mode, audio from Endpoint A is emitted at Endpoint B, and vice versa. This is two-transmission is generally acceptable because, although a microphone at a given endpoint will pick up audio from both the loudspeaker and from a participant speaking at the endpoint, the audio from the participant will substantially mask the audio from the near end loudspeaker.

The double-talk detection unit compares the audio signal coming from a remote endpoint, (the far-end), with the audio signal coming from the microphone at the endpoint (near end) If, for example, the energy of the incoming signal is high, and the energy of the microphone signal is low, then the first operating mode described in the preceding paragraph is implemented. On the other hand, if neither signal has energy which exceeds that of the other by a predetermined amount, (e.g., an absolute value or a relative percentage), then two-way talk is appropriate and the endpoint emit audio from the far end (using a loudspeaker at the endpoint), and transmit audio picked up at the endpoint by the near end microphone. To gain more accurate detection performance, in some embodiments the energy comparison is performed independently on separate regions of the frequency spectrum. For example, the energy comparison could be done independently on spectral regions of 200 Hz width. If the microphone energy exceeded the estimated loudspeaker energy for any spectral region, then it would be declared that both near-end and far-end participants were talking. For example, spectral regions can be compared in 200 Hz regions starting at about 300 Hz up to about 8000 Hz, (e.g., 300-500 Hz, 500-700 Hz, 700-900 Hz . . . 7800-8000 Hz).

In at least one embodiment, double-talk can be declared as soon as it is determined that microphone energy in a given spectral region exceeds a non-zero energy value in the same spectral region of the loudspeaker, and thus no additional comparisons are necessary for the double-talk "check" in question. It will be understood by those in the art that determining which endpoint is speaking or whether double-talk is present is done iteratively through a communications session.

The discussion of double-talk detection thus far has not addressed the issue of distortion, in particular distortion of the audio emitted by the loudspeaker. Distortion creates energy in spectral regions not present in the original signal. For example, distortion of a sine wave creates energy at harmonics of the sine wave frequency. The distortion of the incoming audio signal effectively increases the loudspeaker energy in various spectral regions to a level greater than would be present if no distortion were present. The distorted loudspeaker audio is picked up by the near end microphone along with other audio at the endpoint, and thus the energy of the distortion is included in the microphone energy. This in turn, affects the accuracy of the double-talk detection unit. For example, if all other factors remain equal (unchanged), the double-talk detection unit is more likely to detect high microphone energy, and thus more likely to determine that a person is speaking at the near end, when in fact the energy detected by the double-talk detection unit is actually energy from the distortion.

In at least one example endpoint, a first microphone, also known as a detector microphone, is situated very near the loudspeaker, while one or more other microphones are much farther away from the loudspeaker. The detector microphone is placed close enough to the loudspeaker such that when the loudspeaker emits audio, the loudspeaker audio masks any other near end audio (such as the sound of a person talking at the endpoint). The microphone signal thus includes a linear component, corresponding to the far end signal sent to the loudspeaker, and a non-linear component, corresponding to the distortion. An adaptive filter removes nearly all of the loudspeaker energy—the linear component of the microphone energy—leaving the non-linear distortion energy. Logically, the distortion signal is not transmitted to the far end. The detector microphone, and the adaptive filter just described, thus form a 'distortion detector/unit.' For reasons explained below, a scaled (reduced) version of this non-linear distortion energy is sent to the double-talk detection unit(s) for the other speaker(s).

Like the distortion detection unit, the one or more other microphones also pickup audio coming from the loudspeaker. However, because the other speakers are more distant from the loudspeaker, the audio they pickup carries less energy than the audio heard by the distortion detection unit. The signal coming from the base microphone will, like that coming from the detector microphone, have both a linear component, as well as a non-linear component stemming from the distortion. This non-linear component at the base microphone has the same audio signature as that detected by the distortion detection unit, but its energy is much more attenuated.

As noted previously, the distortion energy at the detection unit is scaled for the double-talk detection unit of the base microphone. The goal of this scaling is to make the energy value of the distortion provided to the double-talk detection unit be equal to the distortion energy that would have been detected by the detection unit were it at the location of the base microphone, in other words to make the energy value sent from the distortion detection unit to the double-talk detection unit as close to the energy value of the non-linear component coming from the base microphone. The scaled distortion energy value is added to the energy value of the signal received from the far end. When the double-talk detection unit compares the incoming signal energy with the base microphone signal energy, the (scaled) distortion energy value from the distortion detection unit substantially offsets the distortion energy in the microphone signal. The accuracy of the double-talk detection unit is thus enhanced. The value of the scaling factor for each base microphone will depend upon, among other things, the type of base microphone used, its analog and digital gain, and its relative distance from the loudspeaker visa-vis the distortion detection unit.

FIG. 1 illustrates a conferencing apparatus or endpoint 10 in accordance with an embodiment of this disclosure. Conferencing apparatus or endpoint 10 of FIG. 1 communicates with one or more remote endpoints 60 over a network 55. The endpoint 10 includes an audio module 30 with an audio codec 32, and a video module 40 with a video codec 42. These modules 30/40 operatively couple to a control module 20 and a network module 50. In implementations of the technology which only involve audio communication, video module 40 with a video codec 42 can be omitted.

A microphone 120 captures audio and provides the audio to the audio module 30 and codec 32 for processing. The microphone 120 can be a table or ceiling microphone, a part of a microphone pod, an integral microphone to the endpoint, or the like. Additional microphones 121 can also be provided. Throughout this disclosure all descriptions relating to microphone 120 apply to any additional microphones 121, unless otherwise indicated. The endpoint 10 uses the audio captured with the microphone 120 primarily for the conference audio. In general, the endpoint 10 can be a conferencing device, a videoconferencing device, a personal computer with audio or video conferencing abilities, or any similar type of communication device. If the endpoint 10 is used for videoconferencing, a camera 46 captures video and provides the captured video to the video module 40 and codec 42 for processing.

After capturing audio and video, the endpoint 10 encodes it using any of the common encoding standards, such as MPEG-1, MPEG-2, MPEG-4, H.261, H.263 and H.264. Then, the network module 50 outputs the encoded audio and video to the remote endpoints 60 via the network 55 using any appropriate protocol. Similarly, the network module 50 receives conference audio and video via the network 55 from the remote endpoints 60 and sends these to their respective codec 32/42 for processing. Eventually, a loudspeaker 130 outputs conference audio (received from a remote endpoint), and a display 48 can output conference video. The endpoint 10 includes a distortion detection module 199 for detecting distortion that may be introduced when the loudspeaker 130 outputs audio. Many of these modules and other components can operate in a conventional manner well known in the art so that further details are not provided here.

The endpoint 10 further includes an acoustic echo cancellation module 200 that reduces acoustic echo. As is known, acoustic echo results from far-end audio output by the loudspeaker 130 being subsequently picked up by the local microphone 120, reprocessed, and sent back to the far-end. Additional microphones 121 can operate by the same principle. The acoustic echo cancellation module (200) can be based on acoustic echo cancellation techniques known and used in the art to reduce or eliminate this form of echo. For example, details of acoustic echo cancellation can be found in U.S. Pat. Nos. 5,263,019 and 5,305,307, which are incorporated herein by reference in their entireties, although any other number of available sources have details of acoustic echo cancellation. As will be discussed in greater detail below, the acoustic echo cancellation module 200 includes a double-talk detection unit (208), the purpose of which is to determine when persons/speakers are talking at the nearend (at endpoint 10) and people are talking at a remote endpoint 10 simultaneously. In that situation, the endpoint 10 can allow audio from the near end and far-end to pass to the other. In simple terms, the double-talk detection unit (208) compares the energy of an audio signal received from a remote endpoint 60 with the energy in the audio signal coming from microphone 120. When the double-talk detection unit determines that the two energies are relative to one another in a predetermined relationship (for example near end energy is twice that received from the far-end), the detection unit (208) determines that double-talk is present. That is, the detection unit (208) determines that persons at the near end (10) and persons at the far-end are speaking substantially simultaneously. Distortion introduced by the loudspeaker 130, however, affects the performance of the double-talk detection unit, as will be discussed in greater detail below. As noted, and as will be discussed in greater detail, determining the energy corresponding to the distortion coming from loudspeaker 130 can improve the performance of one or more double-talk detection units (208) of microphones 120, 121.

Figure 2:
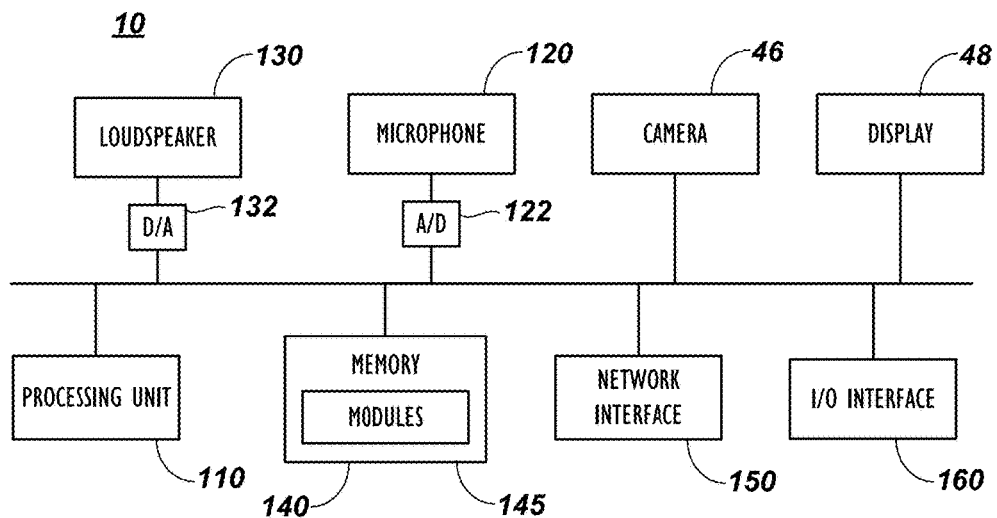
FIG. 2 illustrates components of the conferencing endpoint of FIG. 1 in detail.

FIG. 2 illustrates components of the conferencing endpoint of FIG. 1 in detail. The endpoint 10 has a processing unit 110, memory 140, a network interface 150, and a general input/output (I/O) interface 160 coupled via a bus 100. As above, the endpoint 10 has the base microphone 120 and loudspeaker 130 and can have the video components of a camera 46 and a display 48 if desired.

The memory 140 can be any conventional memory such as SDRAM and can store modules 145 in the form of software and firmware for controlling the endpoint 10. The stored modules 145 include the various video and audio codecs 32/42 and other modules 20/30/40/50/200 discussed previously. Moreover, the modules 145 can include operating systems, a graphical user interface (GUI) that enables users to control the endpoint 10, and other algorithms for processing audio/video signals.

The network interface 150 provides communications between the endpoint 10 and remote endpoints (60). By contrast, the general I/O interface 160 can provide data transmission with local devices such as a keyboard, mouse, printer, overhead projector, display, external loudspeakers, additional cameras, microphones, etc.

During operation, the loudspeaker 130 outputs audio in the conference environment. For example, this output audio can include far-end audio received from remote endpoints via the network interface 150 and processed with the processing unit 110 using the appropriate modules 145. At the same time, the microphone 120 captures audio in the conference environment and produces audio signals transmitted via the bus 100 to the processing unit 110.

For the captured audio, the processing unit 110 processes the audio using algorithms in the modules 145. In general, the endpoint 10 processes the near-end audio captured by the microphone 120 and the far-end audio received from the transmission interface 150 to reduce noise and cancel out acoustic echo that may occur between the captured audio. Ultimately, the processed audio can be sent to local and remote devices coupled to interfaces 150/160.

In particular, the endpoint 10 uses the acoustic echo canceller 200 of FIG. 1 that can operate on the signal processor 110. The acoustic echo canceller 200 removes the echo signal from the captured near-end signal that may be present due to the loudspeaker 130 in the conference environment.

As shown in FIG. 2, the microphone 120 uses an analog-to-digital (A/D) converter 122 that runs off a clock 124. The loudspeaker 130 by contrast uses a digital-to-analog (D/A) converter 132. When attempting to ameliorate the effects of distortion in the loudspeaker 130 audio, digital and analog gain of each component may need to be taken into account.

Figure 3:
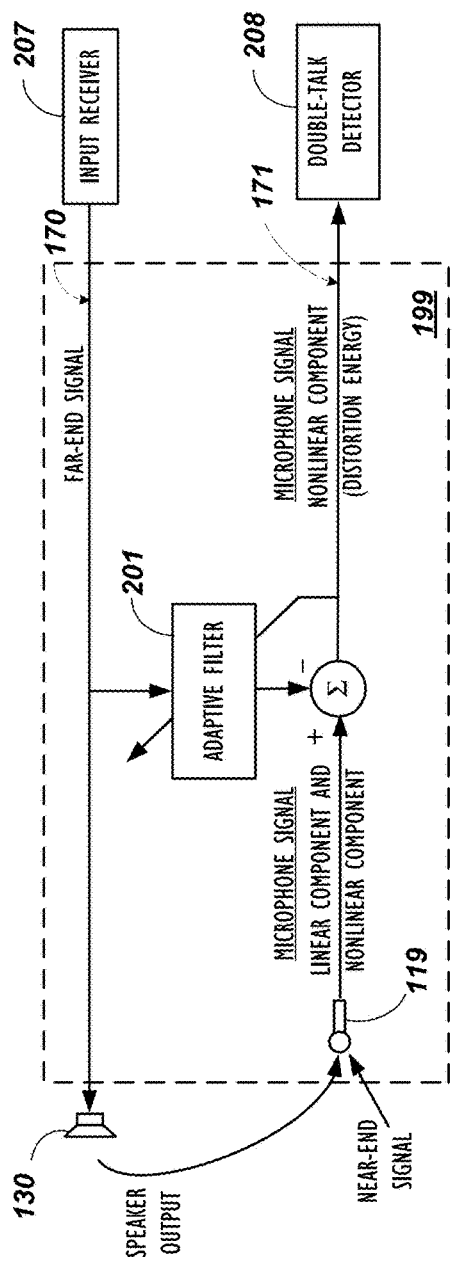
FIG. 3 illustrates a distortion detection unit of a conferencing endpoint in accordance with an embodiment of this disclosure.

FIG. 3 illustrates a distortion detection module 199. The distortion detection module 199 includes a microphone 119 that is several orders of magnitude closer to loudspeaker 130 than microphone 120. In at least one embodiment, the detector microphone 119 is less than three millimeters away from the loudspeaker 130, whereas microphone 120 is, for example, about 60 millimeters away from the loudspeaker 130. Due to this close proximity, near end audio picked up by detector microphone 119 is masked by the audio emanating from loudspeaker 130. As described above, the signal coming from detector microphone 119 has a linear component, corresponding to a far-end signal, and a non-linear component, corresponding to the distortion added by the loudspeaker 130. Detector microphone 119 is at least substantially non-distortive—the less distortive the better. An adaptive filter 201 matches the far-end signal 170 to the microphone signal, and the distortion detection unit 199 subtracts the far-end signal 170 from the microphone signal 171, leaving the non-linear component corresponding to the distortion. The energy value of the distortion is scaled in accordance with the relative distances of the detector microphone 119 and the base microphone 120, and the scaled value is sent to the double-talk detection unit 208 of base microphone 120. Scaling is necessary because the distortion energy picked up by microphone 120 is less than that picked up by detector microphone 119.

Figure 4:
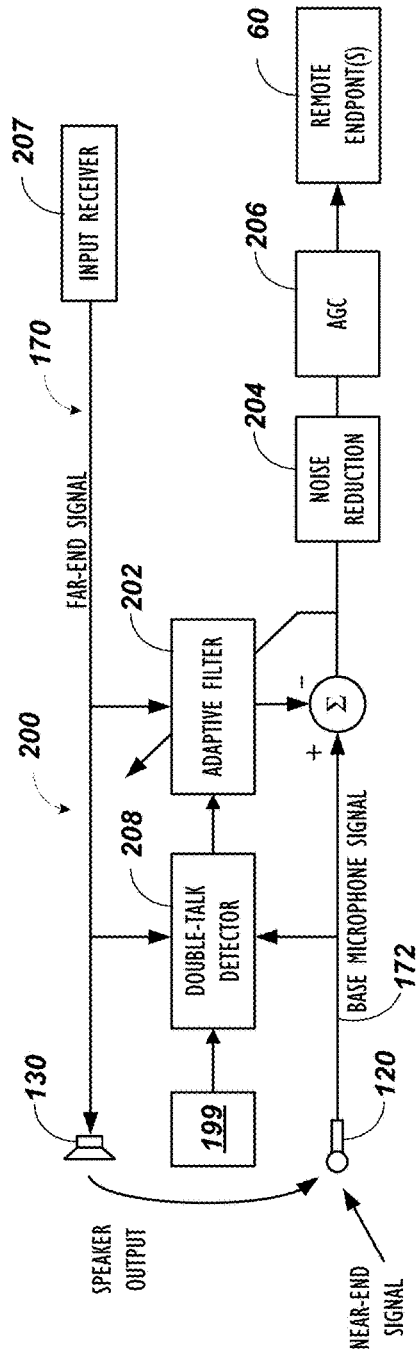
FIG. 4 illustrates an acoustic echo canceller and other processing components of a conferencing endpoint in accordance with an embodiment of this disclosure.

FIG. 4 shows features of an acoustic echo canceller 200 and other processing components for a conferencing microphone (e.g., 120, 121) according to the present disclosure. The canceller 200 can use some of the common techniques to cancel acoustic echo. In general, the canceller 200 receives the far-end signal 170 as input and passes the signal 170 to the loudspeaker 130 for output. Concurrently, the canceller 200 receives an input signal from the base microphone 120. This microphone signal 172 can include the near-end audio signals, any echo signal, and whatever background noise may be present. An adaptive filter 202 can match the far-end signal 170 to the microphone signal 172, and the canceller 200 can remove the far-end signal 170 from the microphone signal 172. The resulting signal can then substantially lack the acoustically coupled echo from the loudspeaker 130. Even so, it can be advantageous to limit two-way audio transmission to only those situations in which participants are speaking at endpoint 10 and remote endpoint 60 at substantially the same time.

The canceller 200 can include a double-talk detection unit 208 configured to determine if the current conference audio represents single-talk (speaker(s) at one (near or far) end) or represents double-talk (participant's speaking at the near end and at the far-end). As noted above, the double-talk detection unit 208 compares the energy of the microphone signal 172 with the energy of the far-end signal 170. However, the scaled distortion energy of signal 171 from distortion detection unit 199 is added to the far-end signal energy. This addition substantially cancels out the distortion energy in the microphone signal 172, which means, in effect, that the double-talk detection unit 208 will not mistakenly interpret the distortion as a near end speaker. Thus, false positives by the double-talk detection unit 208 are minimized.

In some implementations, the adaptive filter 202 may be modified or not operated when double-talk is determined, or echo cancellation may be stopped altogether during double-talk. In addition, the signal processing by the canceller 200 can use noise suppression, buffering delay, equalization, automatic gain control, speech compression (to reduce computation requirements), and other suitable processes. For example, the microphone output signal 172 may pass through noise reduction 204, automatic gain control 206, and any other form of audio processing before transmission.

Figure 5:
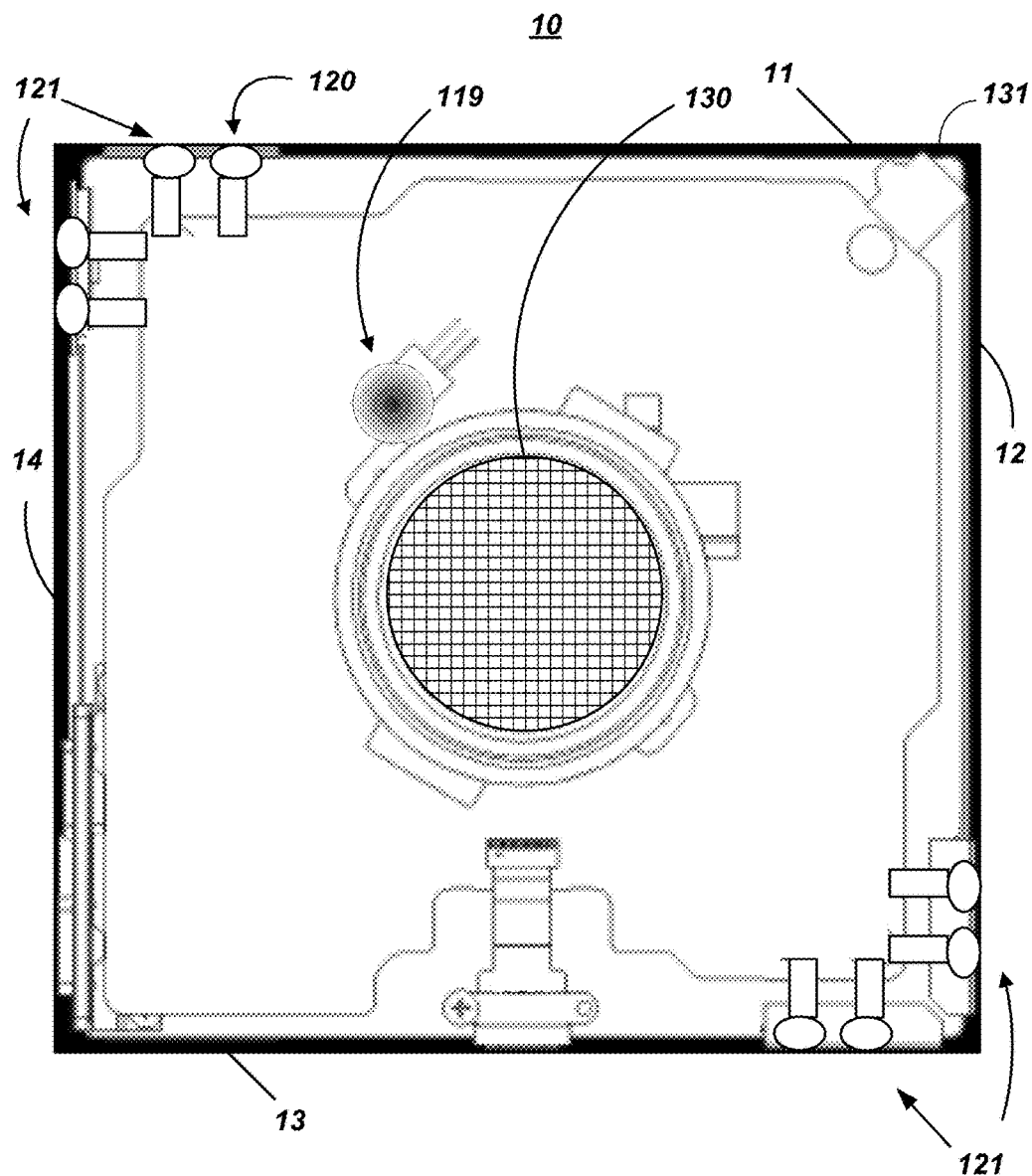
FIG. 5 illustrates aspects of a conferencing endpoint in accordance with an embodiment of this disclosure.

FIG. 5 illustrates aspects of a conferencing endpoint 10 in accordance with an embodiment of this disclosure. As can be seen in FIG. 5, the distortion detection module 199 is much closer to the loudspeaker 130 than microphones 120, 121 are. The top upper surfaces of distortion detection module 199 and loudspeaker 130 are visible. In at least one embodiment, these components 199, 120, 121, 131 are substantially enveloped within a housing structure 131. In at least one embodiment, the sides 11, 12, 13, 14 of the housing structure are each eleven centimeters in length.

The techniques of the present disclosure can be implemented in digital electronic circuitry, computer hardware, firmware, software, or any combinations of these. Aspects of the disclosed techniques can be implemented in a program storage device, computer-readable media, or other tangibly embodied machine-readable storage device for execution by a programmable control device. The disclosed techniques can be performed by a programmable processor executing program instructions to perform functions of the disclosed techniques by operating on input data and generating output.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

The invention claimed is:

1. A method of preventing false positives by a double-talk detection unit at a conferencing endpoint, the method comprising:
   receiving a first signal;
   determining an energy value of the first signal;
   emitting audio at a loudspeaker, the audio based on the first signal;
   collecting audio at a first microphone, the audio including a first linear component corresponding to the first signal, and a first non-linear component corresponding to distortion of the first signal within the emitted audio;
   emitting, by the first microphone, a first microphone signal, the first microphone signal comprising a first linear portion corresponding to the first linear component of the collected audio and a non-linear portion corresponding to the first non-linear component of the collected audio;
   determining an energy value associated with the non-linear portion of the first microphone signal;
   transmitting an energy signal to a double-talk detection unit of a second microphone, the energy signal corresponding to the energy value of the non-linear portion of the first microphone signal multiplied by a scaling factor;
   capturing audio at the second microphone, the audio including a second linear component corresponding to the first signal, and a second non-linear component corresponding to distortion of the first signal within the emitted audio, wherein the second linear component is attenuated relative the first linear component, and the second non-linear component is attenuated relative the first non-linear component;
   determining an energy value of the audio captured at the second microphone;
   receiving the transmitted energy signal at the double-talk detection unit;
   calculating, by the double-talk detection unit, a sum of the energy value of the non-linear portion of the first microphone signal multiplied by the scaling factor with the energy value of the first signal; and
   comparing, by the double-talk detection unit, the sum with the energy value of the audio captured at the second microphone, whereby the double-talk detection unit is prevented from falsely detecting double-talk.

2. The method of claim 1, wherein determining the energy value associated with the non-linear portion of the first microphone signal comprises isolating the non-linear portion of the first microphone signal.

3. The method of claim 2, wherein isolating the non-linear portion of the first microphone signal comprises subtracting the linear portion of the first microphone signal using an adaptive filter.

4. The method of claim 1, further comprising, responsive to comparing the sum with the energy value of the audio captured at the second microphone, muting audio captured by the second microphone.

5. The method of claim 1, wherein the scaling factor is a positive number less than 1.

6. The method of claim 5, wherein the scaling factor is predetermined based, at least in part, on the relative distances of the first microphone and the second microphone from the loudspeaker.

7. The method of claim 5, wherein the first microphone and the second microphone are substantially non-distortive.

8. A memory storing instructions executable by at least one processor, the instructions comprising instructions to:
   receive a first signal at an endpoint;
   determine an energy value of the first signal;
   emit audio at a loudspeaker, the audio based on the first signal;
   collect audio at a first microphone, the audio including a first linear component corresponding to the first signal, and a first non-linear component corresponding to distortion of the first signal within the emitted audio;
   emit, by the first microphone, a first microphone signal, the first microphone signal comprising a first linear portion corresponding to the first linear component of the collected audio and a non-linear portion corresponding to the first non-linear component of the collected audio;
   determine an energy value associated with the non-linear portion of the first microphone signal;
   transmit an energy signal to an echo canceller of a second microphone, the energy signal corresponding to the energy value of the non-linear portion of the first microphone signal multiplied by a scaling factor
   capture audio at the second microphone, the captured audio including a second linear component corresponding to the first signal, and a second non-linear component corresponding to distortion of the first signal within the emitted audio, wherein the second linear component is attenuated relative the first linear component, and the second non-linear component is attenuated relative the first non-linear component;
   determine an energy value of the audio captured at the second microphone;
   receive the transmitted energy signal at the echo canceller;
   determine, at the echo canceller, a sum of the energy value of the non-linear portion of the first microphone signal multiplied by the scaling factor with the energy value of the first signal;
   determine, at the echo canceller, that the sum exceeds the energy value of the audio captured at the second microphone by a predetermined value; and
   responsive to the determination that the sum exceeds the energy value of the audio captured at the second microphone by the predetermined value, allow transmission of the audio captured at the second microphone.

9. The memory of claim 8, wherein the instructions to determine the energy value associated with the non-linear portion of the first microphone signal comprise instructions to isolate the non-linear portion of the first microphone signal.

10. The memory of claim 9, wherein the instructions to isolate the non-linear portion of the first microphone signal comprise instructions to subtract the linear portion from the first microphone signal using an adaptive filter.

11. The memory of claim 8, wherein the instructions to transmit the energy signal to the echo canceller comprise instructions to transmit the energy signal to a double-talk detection unit of the echo canceller.

12. The memory of claim 8, wherein the scaling factor is a value between zero (0) and one.

13. The memory of claim 12, wherein the scaling factor is predetermined based, at least in part, on the relative distances of the first microphone and the second microphone from the loudspeaker.

14. The memory of claim 12, wherein the first microphone and the second microphone are substantially non-distortive.

15. A conferencing endpoint, the conferencing endpoint comprising:
at least one input, the input configured to receive a first signal, the first signal having an energy value;
at least one loudspeaker coupled to the input, the loudspeaker configured to emit audio, the audio based on the first signal;
at least one distortion detection module proximate the loudspeaker, the distortion detection module configured to collect audio, the collected audio including a first linear component corresponding to the first signal, and a first non-linear component corresponding to distortion of the first signal within the emitted audio, and further configured to emit a detection signal, the detection signal comprising a first linear portion corresponding to the first linear component of the collected audio and a non-linear portion corresponding to the first non-linear component of the collected audio;
at least one microphone configured to capture audio, the captured audio including a second linear component corresponding to the first signal, and a second non-linear component corresponding to distortion of the first signal within the captured audio, wherein the second linear component is attenuated relative the first linear component, and the second non-linear component is attenuated relative the first non-linear component;
at least one processing unit coupled to the input, the loudspeaker, the microphone, and the distortion detection module, the processing unit configured to:
determine an energy value associated with the non-linear portion of the detection signal;
apply a scaling factor to the energy value associated with the non-linear portion of the detection signal;
determine a sum of the scaled energy value of the non-linear portion of the detection signal with the energy value of the first signal;
compare the sum with an energy value of the captured audio; and
transmit the captured audio when the sum exceeds the energy value of the captured audio.

16. The conferencing endpoint of claim 15, wherein determining the energy value associated with the non-linear portion of the detection signal comprises isolating the non-linear portion of the detection signal.

17. The conferencing endpoint of claim 16, wherein isolating the non-linear portion comprises subtracting the linear portion from the detection signal using an adaptive filter.

18. The conferencing endpoint of claim 15, wherein emitting the detection signal comprises transmitting the energy detection signal to a double-talk detection module coupled to the processing unit.

19. The conferencing endpoint of claim 15, wherein the scaling factor is based, at least in part, on a gain of the microphone.

20. The conferencing endpoint of claim 15, wherein a distance from a central region of a top of the loudspeaker to the microphone is at least eighteen times greater than a distance from the central region of the top of the loudspeaker to the distortion detection module.

21. The conferencing endpoint of claim 20, wherein no portion of the distortion detection module is more than three millimeters distant from the portion of the loudspeaker to which the distortion detection module is closest.

* * * * *